United States Patent
Hara et al.

(10) Patent No.: US 7,657,229 B2
(45) Date of Patent: Feb. 2, 2010

(54) METHOD AND DEVICE FOR REPORTING INFORMATION RELATED TO INTERFERENCE COMPONENTS RECEIVED BY A FIRST TELECOMMUNICATION DEVICE IN SOME FREQUENCY SUBBANDS TO A SECOND TELECOMMUNICATION DEVICE

(75) Inventors: Yoshitaka Hara, Rennes (FR); David Mottier, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 556 days.

(21) Appl. No.: 11/611,598

(22) Filed: Dec. 15, 2006

(65) Prior Publication Data

US 2007/0157279 A1 Jul. 5, 2007

(30) Foreign Application Priority Data

Dec. 27, 2005 (EP) .................................. 05292815

(51) Int. Cl.
*H04B 1/00* (2006.01)
(52) U.S. Cl. ................ 455/63.1; 455/114.2; 455/278.1; 455/296; 455/501; 375/144; 375/148
(58) Field of Classification Search ................ 455/63.1, 455/114.2, 278.1, 296, 501, 67.13, 222; 375/144, 375/148, 346
See application file for complete search history.

(56) References Cited

U.S. PATENT DOCUMENTS

| | | | |
|---|---|---|---|
| 6,941,123 B2 * | 9/2005 | Choi et al. ................... | 455/273 |
| 7,039,363 B1 * | 5/2006 | Kasapi et al. ............ | 455/67.11 |
| 7,362,830 B2 * | 4/2008 | Chul ........................... | 375/347 |
| 7,457,590 B2 * | 11/2008 | Frank ............................ | 455/69 |
| 2003/0125091 A1 * | 7/2003 | Choi et al. ................... | 455/562 |
| 2004/0228420 A1 * | 11/2004 | Chul ........................... | 375/267 |
| 2005/0136841 A1 * | 6/2005 | Frank ............................ | 455/65 |
| 2008/0039146 A1 * | 2/2008 | Jin ........................... | 455/562.1 |

FOREIGN PATENT DOCUMENTS

| WO | WO 03/001761 A1 | 1/2003 |
|---|---|---|
| WO | WO 2004/038985 A2 | 5/2004 |

OTHER PUBLICATIONS

M. Muenster, et al., "Co-Channel Interference Suppression Assisted Adaptive OFDM in Interference Limited Environments", IEEE Vehicular Technology Conference, vol. 1, Conf. 50, Sep. 19-22, 1999, XP-000929056, pp. 284-288.

* cited by examiner

*Primary Examiner*—Minh D Dao
(74) *Attorney, Agent, or Firm*—Oblon, Spivak, McClelland, Maier & Neustadt, L.L.P.

(57) ABSTRACT

The present invention concerns a method and a device for reporting, through a wireless network using multiple frequency subbands, interference components received by a first telecommunication in a first and a second frequency subbands of the wireless network, to a second telecommunication device. The first telecommunication device measures the interference components it receives in the first and second frequency subbands, determines at least a first weight from the measured interference components in the first frequency subband and at least a second weight from the measured interference components in the second frequency subband, weights a first pilot signal with the at least one first determined weight and a second pilot signal with the at least one second determined weight, transfers the first weighted pilot signal through said first frequency subband and the second weighted pilot signal through said second frequency subband to the second telecommunication device.

26 Claims, 7 Drawing Sheets

METHOD AND DEVICE FOR REPORTING INFORMATION RELATED TO INTERFERENCE COMPONENTS RECEIVED BY A FIRST TELECOMMUNICATION DEVICE IN SOME FREQUENCY SUBBANDS TO A SECOND TELECOMMUNICATION DEVICE

The present invention relates generally to telecommunication systems and in particular, to methods and devices for reporting information related to interference components received by a telecommunication device to another telecommunication device.

Recently, efficient transmission schemes in space and frequency domains have been investigated to meet the growing demand for high data rate wireless communications. In recent years, Orthogonal Frequency Division Multiplexing Access scheme have been discussed for mobile communication systems.

In such systems, the base station is expected to control the transmission of signals to terminals. The base station determines the modulation and coding schemes to be used for transferring signals representative of groups of data to the terminals and/or determines the terminals to which, signals have to be transferred on a subset of frequency subbands, according the quality of the communication channel between the base station and the terminals.

For that, the base station obtains from the terminals, information related to the quality of the channel between the base station and the terminals.

Classically, the Signal to Interference plus Noise Ratio measured by the terminals is used as a channel quality indication. Each terminal reports to the base station channel quality indication for each of the subbands of the OFDMA system. Such channel quality indications reporting is performed by transferring a large amount of information bits from each terminal to the base station. Such reporting requires an important part of the available bandwidth of the OFDMA system.

When the base station and/or the terminals have multiple antennas, the amount of information to be transferred as channel quality indications increases according to the number of antennas. When the channel is reciprocal, e.g. in Time Division Multiplex systems, the channel conditions are obtained according to the following method: each terminal transfers pilot signals to the base station, the base station receives the pilot signals, determines, for each of the terminals, the channel responses from the received pilot signals, forms a channel matrix which is representative of the channel conditions and uses the determined matrix in order to send the signals which have to be transferred to the respective terminals.

The coefficients of the channel matrix are the complex propagation gain between the antennas of the base station and the antennas of the terminal which sent the pilot signals.

Such determination of the channel conditions is effective when the terminal receives, in parallel with the signals transferred by the base station, interference components of the same power in each subband. If the terminal receives interference components of different power in some subbands, it is also necessary for the terminals to report their respective interference components or their respective Signal to Interference plus Noise Ratio in each subband. Such reporting requires also an important part of the available bandwidth of the OFDMA system.

The aim of the invention is therefore to propose methods and devices which allow the reporting of information related to interference components received by a telecommunication device to another telecommunication device without decreasing in an important manner the bandwidth of the uplink channel which is used for classical data transmission.

To that end, the present invention concerns a method for reporting, through a wireless network using multiple frequency subbands, interference components received by a first telecommunication in a first and a second frequency subbands of the wireless network, to a second telecommunication device, characterised in that the method comprises the steps executed by the first telecommunication device of:

measuring the interference components received by the first telecommunication device in the first frequency subband and in the second frequency subband of the wireless network, determining at least a first weight from the measured interference components in the first frequency subband and at least a second weight from the measured interference components in the second frequency subband, weighting a first pilot signal with the at least one first determined weight and weighting a second pilot signal with the at least one second determined weight, transferring the first weighted pilot signal through said first frequency subband and the second weighted pilot signal through said second frequency subband to the second telecommunication device.

The present invention concerns also a device for reporting, through a wireless network using multiple frequency subbands, interference components received by a first telecommunication in a first and a second frequency subbands of the wireless network, to a second telecommunication device, characterised in that the device for reporting interference components is included in first telecommunication device and comprises:

means for measuring the interference components received by the first telecommunication device in the first frequency subband and in the second frequency subband of the wireless network, means for determining at least a first weight from the measured interference components in the first frequency subband and at least a second weight from the measured interference components in the second frequency subband, means for weighting a first pilot signal with the at least one first determined weight and weighting a second pilot signal with the at least one second determined weight, means for transferring the first weighted pilot signal through said first frequency subband and the second weighted pilot signal through said second frequency subband to the second telecommunication device.

Thus, the first telecommunication device can report information related to interference components it receives in some frequency subbands to a second telecommunication device without decreasing in an important manner the bandwidth which is used for classical data transmission.

According to a first mode of realisation of the present invention, the first telecommunication device and the second telecommunication device comprise one antenna, and the first and second determined weights are respectively inversely proportional to the interference components measured in the first and second frequency subbands.

Thus, the determination, for each first and second frequency subbands, of at least one first and second weights from the measured interference components in the respective first and second frequency subbands is simple and accurate.

According to another advantageous embodiment, the first telecommunication device determines a power information for the first and second frequency subbands, and transfers to the second telecommunication device signals representing the power information.

Thus, if the first telecommunication device adjusts its transmission power, the second telecommunication device is aware about that adjustment.

Furthermore, as far as a single power information is transferred, the bandwidth which is used for classical data transmission is not decreased in an important manner.

According to another advantageous embodiment, a power information is determined for each of the first and second frequency subbands and for other frequency subbands according to the following formula:

$$\eta = P_S \left( \frac{1}{L} \sum_{l=1}^{L} \frac{1}{I_l} \right)^{-1},$$

where $P_S$ is the average transmit power per frequency subband, L is the number of the first, second frequency and other frequency subbands, l is an indicia of the first second and other frequency subbands and $I_l$ is interference components measured in the l-th frequency subband.

Thus, if the first telecommunication device adjusts its transmission power differently in some frequency bands, the second telecommunication device is aware about each adjustment.

According to a second mode of realisation of the present invention, the first telecommunication devices comprises M antennas, the second telecommunication device comprises N antennas and the measured interferences components are set, for at least the first and second frequency subbands, under the form of an interference correlation matrix $R_{IN,l}$, where l denotes the indicia of the first and second frequency subbands, and the determination, for each first and second frequency subbands, of the at least one first and second weights from the measured interference components is decomposed into:
- executing an eigenvalue decomposition of the interference correlation matrix $R_{IN,l} = F_l \Phi_l F_l^H$ in order to obtain a first matrix $F_l$ and a second matrix $\Phi_l$, where $F_l^H$ denotes the complex conjugate transpose of the matrix $F_l$,
- determining, for the first and second frequency subbands respectively at most M weighting vectors $g_{l,m}$ from at least the first and the second matrices, where m=1 to at most M,
- weighting each of the at most M pilot signals by a respective weighting vector.

Thus, the first telecommunication device can report information related to interference components it receives in some frequency subbands to a second telecommunication device without decreasing the bandwidth which is used for classical data transmission.

Furthermore, the present invention is also adapted for systems which combine multi frequency subbands and MIMO schemes.

According to another advantageous embodiment, the at most M weighting vectors $g_{l,1}$ to $g_{l,M}$ are determined according to the following formula:

$[g_{l,1}, \ldots, g_{l,M}] = F_l^* \Phi_l^{-1/2}$ where $x^*$ denotes the conjugate of x.

Thus, the determination of the weighting vectors $g_{l,1}$ to $g_{l,M}$ is simple fits with the spatial direction of the received interference components and their intensity.

According to another advantageous embodiment, the first telecommunication device determines at least a power coefficient, weights the at most M pilot signals by the power coefficient and transfers to the second telecommunication device signals representing at least a power information which is related to the determined power coefficient.

Thus, if the first telecommunication device adjusts its transmission power, the second telecommunication device is aware about that adjustment.

According to another advantageous embodiment, a power coefficient $\sqrt{\eta}$ is determined for the first and second frequency subbands according to the following formula:

$$\eta = P_S \left( \frac{1}{M} tr\{R_{IN,l}^{-1}\} \right)^{-1}$$

where $tr\{x\}$ is the trace of the matrix x and $P_s$ is the average transmit power per frequency subband and per antenna and the power information is equal to $\eta$.

According to another advantageous embodiment, a power coefficient $\eta_l$ is determined for each first, second and for other frequency subbands according to the following formula:

$$\eta_l = P_S \left( \frac{1}{ML} \sum_{l=1}^{L} tr\{R_{IN,l}^{-1}\} \right)^{-1}$$

where $tr\{x\}$ is the trace of the matrix x and $P_s$ is the average transmit power per frequency subband and per antenna and the power information is equal to $\eta_l$.

According to another advantageous embodiment, each frequency subband include plural subcarrier frequencies and the measured the interference components received by the first telecommunication device in the first frequency subband are the average of the interference components measured in each of the subcarrier frequencies of the first frequency subband and the measured the interference components received by the first telecommunication device in the second frequency subband are the average of the interference components measured in each of the subcarrier frequencies of the second frequency subband.

Thus, the interference components measured in each subband frequency takes into account all the interference components received in each subcarrier frequency of a frequency subband.

According to another advantageous embodiment, each frequency subband include plural subcarrier frequencies and the measured the interference components received by the first telecommunication device in the first frequency subband are the interference components measured in at least a subcarrier frequency of the first frequency subband and the measured the interference components received by the first telecommunication device in the second frequency subband the interference components measured in at least a subcarrier frequency of the first frequency subband.

Thus, only some interference components measured in at least one subcarrier frequency is s taken into account.

According to still another aspect, the present invention concerns a method for controlling the transfer of signals to a first telecommunication device by a second telecommunication device through a wireless network using multiple frequency subbands, characterised in the method comprises the steps executed by the second telecommunication device of:

receiving from the first telecommunication device, at least a first pilot signal through a first frequency subband and at least a second pilot signal through a second frequency subband, determining, from the at least first pilot signal, information representative of interference components received by the first telecommunication device in the first frequency subband, determining, from the at least second pilot signal, information representative of interference components received by the first telecommunication device in the second frequency subband, controlling the transfer of signals representative of a group of data to the first telecommunication device according to the determined information representative of interference components received by the first telecommunication device.

The present invention concerns also a device for controlling the transfer of signals to a first telecommunication device by a second telecommunication device through a wireless network using multiple subbands, characterised in the device for controlling the transfer of signals is included in the second telecommunication device and comprises:

means for receiving, from the first telecommunication device, at least a first pilot signal through a first frequency subband and at least a second pilot signal through a second frequency subband, means for determining, from the at least first pilot signal, information representative of interference components received by the first telecommunication device in the first frequency subband, means for determining, from the at least second pilot signal, information representative of interference components received by the first telecommunication device in the second frequency subband, means for controlling the transfer of signals representative of a group of data to the first telecommunication device according to the determined information representative of interference components received by the first telecommunication device.

Thus, the second telecommunication device is informed about the interference components received by the first telecommunication device in some frequency subbands without decreasing in an important manner the bandwidth which is used for classical data transmission and can then reduce the effect of the interference components on the transferred signals representative of a group of information.

According to the first mode of realisation of the present invention, the first telecommunication device and the second telecommunication device comprise one antenna, and the second telecommunication device receives, from the first telecommunication device, signals representing at least a power information and the information representative of interference components received by the first telecommunication device is determined from the at least first and second pilot signals and the at least one power information.

Thus, if the first telecommunication adjusts its transmission power, the second telecommunication device is aware about that adjustment.

According to another advantageous embodiment, the control of the transfer of signals representative of a group of data to the first telecommunication device is the determination of the transmission power to be used for transferring at least a group of data to the first telecommunication device.

Thus the second telecommunication device can reduce the effect of the interference components received by the first telecommunication device.

According to another advantageous embodiment, the control of the transfer of signals representative of a group of data to the first telecommunication device is the determination of the modulation and coding scheme to be used for transferring signals representative of the group of data to the first telecommunication device.

Thus, the resources of the wireless telecommunication network system are used efficiently.

According to another advantageous embodiment, plural first telecommunication devices transfer at least a first and second pilot signals and signals representative of at least a power information and in that the control of the transfer of signals representative of the group of data to the first telecommunication device is the determination to which first telecommunication device or devices among the plural first telecommunication devices, signals representing at least a group of data have to be transferred.

Thus, the resources of the wireless telecommunication network system are used efficiently.

Furthermore, the present invention is also adapted for systems which combine multi frequency subbands and MIMO schemes.

According to the second mode of realisation of the present invention, the second telecommunication device comprises N antennas and the determined information representative of interference components received by a first telecommunication device in each first and second frequency subbands are a first and a second weighting vectors and in that the control of the transfer of signals representative of a group of data to the first telecommunication device in the first and second frequency subbands is made by weighting the signals representative of the group of data respectively by the first and the second weighting vectors.

Thus, the second telecommunication device can direct the signals transfer to the first telecommunication device according to the interference components received by the first telecommunication device.

According to another advantageous embodiment, the first telecommunication device comprises M antennas, at most M pilot signals are received in each first and second frequency subbands and each weighting vector is determined by:

calculating a matrix $J_l$ from the at most M received pilot signals, where l is an indicia of the first and second frequency subbands, executing, for each first and second frequency subband, an eigenvalue decomposition of the product of two matrices obtained from the calculated matrix in order to obtain eigenvectors and eigenvalues, selecting, for each first and second frequency subband, the eigenvector corresponding to the largest eigenvalue of the respective products of two matrices obtained from the calculated matrix.

Thus, the present invention is also adapted for systems which combine multi frequency subbands and MIMO schemes.

According to another advantageous embodiment, the product of two matrices obtained from the calculated matrix is equal to $J_l^* J_l^T$, where $J_l^*$ denotes the conjugate of $J_l$ and $J_l^T$ denotes the transpose of $J_l$.

According to another advantageous embodiment, the second telecommunication device receives from the first telecommunication device, signals representing at least a power information and the information representative of interference components received by the first telecommunication device is determined from the at most M received pilot signals and the at least one power information.

Thus, if the first telecommunication device adjusts its transmission power, the second telecommunication device is aware about that adjustment.

According to another advantageous embodiment, the control of the transfer of signals representative of a group of data to the first telecommunication device is the determination of the modulation and coding scheme to be used for transferring signals representative of a group of data to the first telecommunication device.

According to another advantageous embodiment, plural first telecommunication devices transfer pilot signals and signals representative of a power information and the control of the transfer of signals representative of a group of data to the first telecommunication device is the determination to which first telecommunication device or devices among the plural first telecommunication devices signals representing at least a group of data have to be transferred.

Thus, the resources of the wireless telecommunication network system are used efficiently.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computers programs are the same as those set out above related to the methods and devices according to the invention, they will not be repeated here.

According to still another aspect, the present invention concerns the signals transferred according to the present invention.

Since the features and advantages relating to the signals are the same as those set out above related to the methods and devices according to the invention, they will not be repeated here.

The characteristics of the invention will emerge more clearly from a reading of the following description of an example embodiment, the said description being produced with reference to the accompanying drawings, among which:

Figure 1:
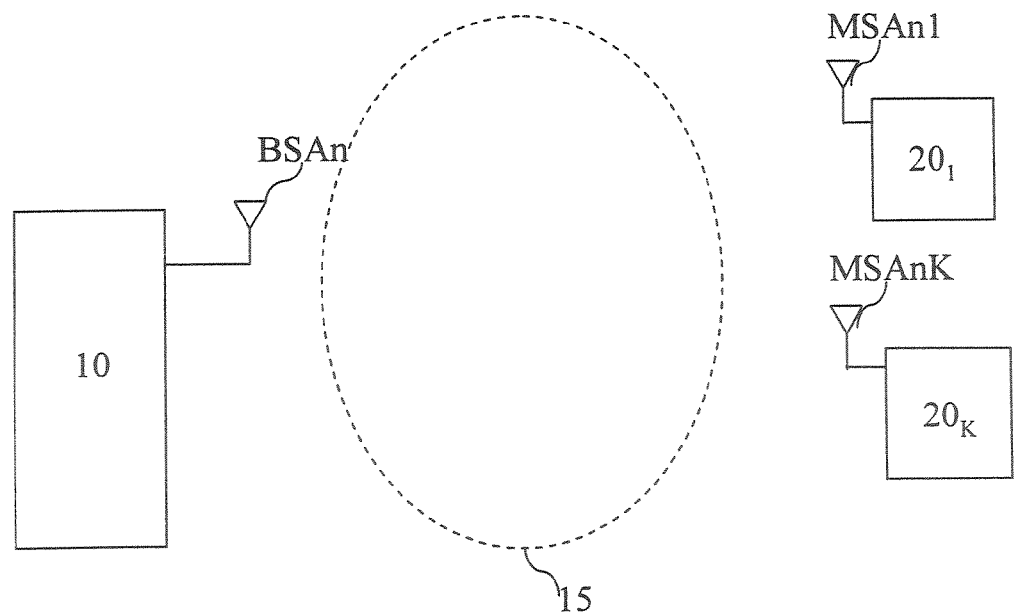
FIG. 1 is a diagram representing the architecture of a first telecommunication system in which the present invention is implemented.

In the first telecommunication system of the FIG. 1, at least one first telecommunication device $20_1$ or $20_K$ is linked through a wireless network 15 to a second telecommunication device 10 using an uplink and a downlink channel.

Preferably and in a non limitative way, the second telecommunication device 10 is a base station or a node of the wireless network 15. The first telecommunication devices $20_1$ to $20_K$ are terminals like mobile phones or personal computers.

The telecommunication network 15 is a wireless telecommunication system which uses Time Division Duplexing scheme (TDD). The signals transferred in uplink and downlink channels are duplexed in different time periods of the same frequency band. The signals transferred within the wireless network 15 share the same frequency spectrum. The channel responses between the uplink and downlink channels of the telecommunication network 15 are reciprocal.

Reciprocal means that if the downlink channel conditions are represented by a downlink matrix the uplink channel conditions can be expressed by an uplink matrix which is the transpose of the downlink matrix.

The first telecommunication network 15 is according to the present invention, a wireless telecommunication system which uses Orthogonal Frequency Division Multiplexing Access scheme (OFDMA).

In an OFDMA scheme, the overall system bandwidth is partitioned into L plural orthogonal frequency subbands, which are also referred to as frequency bins or subchannels. With OFDMA, each frequency subband is associated with respective subcarriers upon which data may be modulated.

The second telecommunication device 10 transfers signals representatives of a group of data to the first telecommunication devices $20_1$ to $20_K$ through the downlink channel and the first telecommunication devices $20_1$ to $20_K$ transfer signals to the second telecommunication device 10 through the uplink channel.

The second telecommunication device 10 has one antenna BSAn. The second telecommunication device 10 determines the modulation and coding scheme to be used for transferring groups of data to each first telecommunication devices 20 and/or determines the first telecommunication device 20 to which, signals representative of a group of data have to be sent according to signals transferred by the first telecommunication devices 20 as it will be disclosed hereinafter.

The signals transferred by the first telecommunication devices $20_1$ to $20_K$ are signals representatives of a group of data and/or pilot signals which are weighted by at least a weight determined from the interference components measured by the first telecommunication devices $20_1$ to $20_K$. Each first telecommunication device $20_1$ to $20_K$ has one antenna noted respectively MSAn1 to MSAnK.

A group of data is as example a frame constituted at least by a header field and a payload field which comprises classical data like data related to a phone call, or a video transfer and so on.

Pilot signals are predetermined sequences of symbols known by the telecommunication devices. Pilot signals are as example and in a non limitative way Walsh Hadamard sequences.

Figure 2:
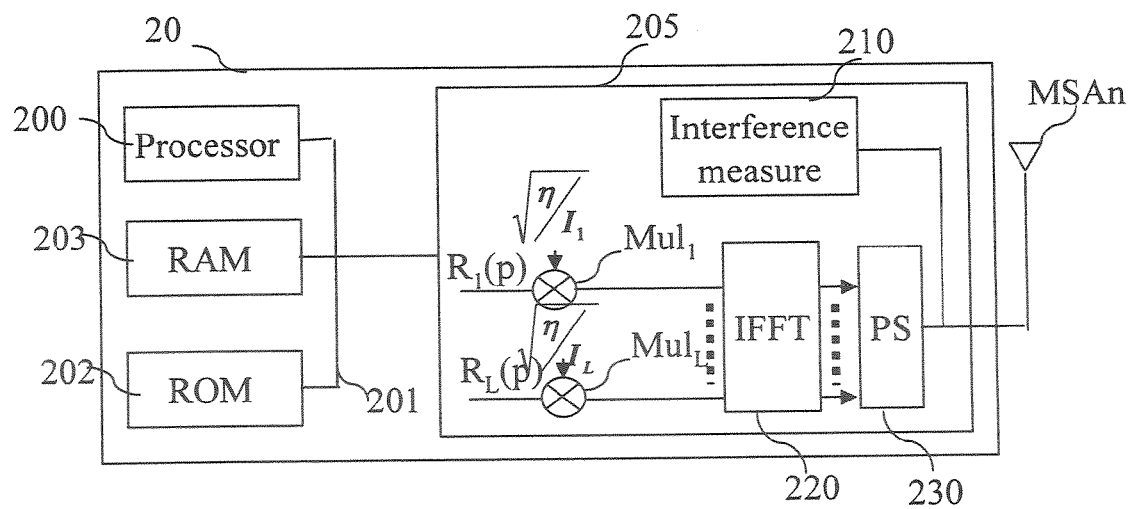
FIG. 2 is a diagram representing the architecture of a first telecommunication device according to a first mode of realisation of the present invention which is used in the first telecommunication system.

FIG. 2 is a diagram representing the architecture of a first telecommunication device according to a first mode of realisation of the present invention which is used in the first telecommunication system.

Figure 4:
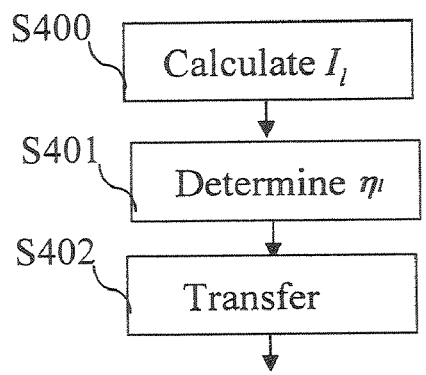
FIG. 4 is an algorithm executed by the first telecommunication device according to the first mode of realisation of the present invention.

The first telecommunication device 20, as example the first telecommunication device $20_k$ with k comprised between 1 and K, has, for example, an architecture based on components connected together by a bus 201 and a processor 200 controlled by programs related to the algorithm as disclosed in the FIG. 4.

It has to be noted here that the first telecommunication device 20 is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 4 which are transferred, when the first telecommunication device $20_k$ is powered on to the random access memory RAM 203.

The RAM memory 203 contains registers intended to receive variables, and the instructions of the programs related to the algorithm as disclosed in the FIG. 4.

According to the first mode of realisation of the present invention, the processor 200 determines, for at least two frequency subbands, and preferably for each of the l=1 to L frequency subbands of the OFDMA system, a weighting coefficient noted $$\sqrt{\frac{\eta}{I_l}}$$

which is determined from the interference components measured by the first telecommunication device $20_k$.

Each weighting coefficient $$\sqrt{\frac{\eta}{I_l}}$$

is determined by a power information η which is representative of the transmit power and the power $I_l$ of the interference components measured by the first telecommunication device $20_k$ in the l-th frequency subband.

The interference components are electromagnetic waveforms generated by other first telecommunication devices, electromagnetic waveforms radiated by any electric equipment and/or any other noise received by the first telecommunication device $20_k$.

Each weighting coefficient $$\sqrt{\frac{\eta}{I_l}}$$

is used for weighting respectively a pilot signal to be transferred to the second telecommunication device 10 through each of the at most L frequency subbands.

The channel interface 205 comprises an interference measurement module 210. When the second telecommunication device 10 transfers signals $s_l(p)$ with $s_l(p)(E\lfloor |s_l(p)|^2\rfloor=1$, a power $P_{BS,l}$ in the l-th frequency subband, the p-th received symbol $x_l(p)$ by the first telecommunication device $20_k$ in the l-th frequency subband is equal to $x_l(p)=\sqrt{P_{BS,l}}h_l s_l(p)+z_l(p)$ where $h_l$ is the complex propagation gain in the frequency subband l between the second telecommunication device 10 and the first telecommunication device $20_k$ and $z_l(p)$ is the interference component of the first telecommunication device $20_k$ which has a power $E\lfloor |z_l(p)|^2\rfloor=I_l$.

The interference measurement module 210 determines, for each of the l=1 to L frequency subbands, the power $I_l$ of the interference components in the l-th frequency subband by averaging, in the l-th frequency subband, $|z_l(p)|^2$ over a large number of samples.

It has to be noted here that, the interferences components may vary in the different subcarrier frequencies included in a frequency subband. The interferences components in the subcarrier frequencies of a subband are then averaged.

In a variant of realisation, instead of averaging the interference components in each subcarrier, the measured interference components in each frequency subband are the interference components measured in at least a subcarrier of a frequency subband, as example the largest interference components measured in a frequency carrier of a frequency subband.

The channel interface 205 comprises at most L multiplication modules. Preferably and in a non limitative way, the channel interface 205 comprises L multiplication modules noted $Mul_1$ to $Mul_L$ which weight respectively the pilot signals $R_l(p)$ to $R_L(p)$ by the respective weighting coefficients $\sqrt{\eta/I_l}$.

The channel interface 205 comprises an Inverse Fast Fourier Transform module (IFFT) 220 which makes an inverse fast Fourier transform on each of the weighted pilot signals $R_l(p)$ to at most $R_L(p)$.

The channel interface 205 comprises a parallel to serial converter 230 which converted the at most L inversed Fourier transformed weighted pilot signals into signals transferred by the antenna MSAn. The channel interface 205 further comprises means for transferring a power information η to the second telecommunication device 10.

The power information η represents the multiplying factor used by the first telecommunication device $20_k$ for weighting the pilot signals.

It has to be noted here that, different power information can be determined for the L frequency subbands. In such case, each determined power information is transferred to the second telecommunication device 10.

Figure 3:
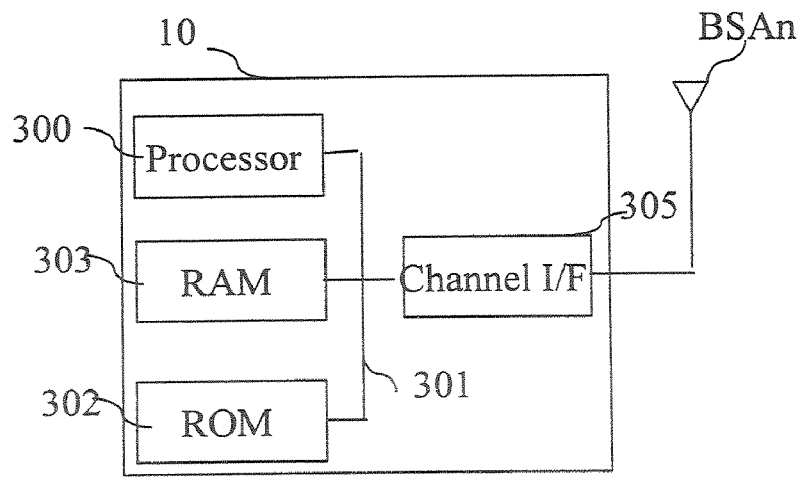
FIG. 3 is a diagram representing the architecture of the second telecommunication device according to the first mode of realisation of the present invention which is used in the first telecommunication system.

FIG. 3 is a diagram representing the architecture of the second telecommunication device according to the first mode of realisation of the present invention which is used in the first telecommunication system.

Figure 5:
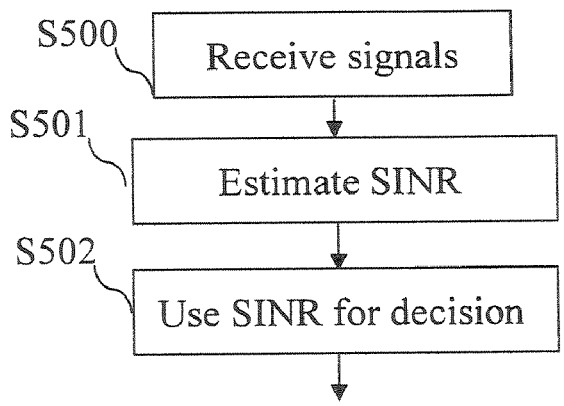
FIG. 5 is an algorithm executed by the second telecommunication device according to the first mode of realisation of the present invention.

The second telecommunication device 10, has, for example, an architecture based on components connected together by a bus 301 and a processor 300 controlled by programs as disclosed in the FIG. 5.

It has to be noted here that the second telecommunication device 10 is, in a variant, implemented into one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the programs related to the algorithm as disclosed in the FIG. 5 which are transferred, when the second telecommunication 10 is powered on to the random access memory RAM 303.

The RAM memory 303 contains registers intended to receive variables, and the instructions of the programs related to the algorithm as disclosed in the FIG. 5.

According to the first mode of realisation of the present invention, the processor 300 is able to determine from at least signals transferred by a first telecommunication device $20_k$ which are representative of pilot signals weighted by weighting coefficients $\sqrt{\eta/I_l}$ transferred in the frequency subbands of the OFDMA system, the modulation and coding scheme to be used for the transfer of groups of signals to that first telecommunication device $20_k$ and/or to determine the first telecommunication device $20_k$ to which signals representative of a group of data have to be sent according to signals transferred by the first telecommunication devices 20.

According to the first mode of realisation of the present invention, the channel interface 305 comprises means for receiving at least one power information $\eta$ from each second telecommunication device 20.

FIG. 4 is an algorithm executed by the first telecommunication device according to the first mode of realisation of the present invention.

The present algorithm is more precisely executed by each of the first telecommunication devices $20_1$ to $20_K$.

At step S400, the processor 200 obtains from the channel interface 205 the power $I_l$, with l=1 to at most L, of the interference components of the first telecommunication device $20_k$ in the at most L respective frequency subbands.

At next step S401, the processor 200 determines the power information $\eta$ which is representative of the transmit power.

At next step S402, the processor 200 commands the transfer, by the channel interface 205 of L uplink pilot signals $$s_l(p) = \sqrt{\frac{\eta}{I_l}} r_l(p),$$

with l=1 to at most L, in each of respective l=1 to at most L frequency subbands. At the same time, the processor 200 transfers the power information $\eta$ to the channel interface 305 which transfers at least a signal representative of the power information $\eta$ to the second telecommunication 10.

In a preferred mode of realisation of the present invention, the processor 200 determines the power information $\eta$ according to the following formula:

$$\eta = P_S \left( \frac{1}{L} \sum_{l=1}^{L} \frac{1}{I_l} \right)^{-1}$$

where $P_S$ is the average transmit power per frequency subband.

According to the invention, the SINR reporting is achieved by transmitting the pilot signal with a power which is inverse proportional to the interference power $I_l$.

FIG. 5 is an algorithm executed by the second telecommunication device according to the first mode of realisation of the present invention.

At step S500, the signals transferred at step S402 by the first telecommunication devices $20_1$ to $20_K$, are received through the channel interface 305 of the second telecommunication device 10.

In the reciprocal TDD system, the p-th symbol transferred by a first telecommunication device $20_k$ in the l-th subband by the second telecommunication device 10 is expressed as:

$$x_{BS,l}(p) = \sqrt{\frac{\eta}{I_l}} h_l r_l(p) + z_{BS,l}(p)$$

where $z_{BS,l}(p)$ is the interference component of the second telecommunication device 10 in the l-th frequency subband.

At next step S501, the processor 300 estimates the SINR of the first telecommunication devices 20 in each frequency subbands. The number of frequency subbands can either equal to two to L.

Using the power information $\eta$ transferred by each first telecommunication device 20 and the second telecommunication device 10 transmit power $P_{BS,l}$, the second telecommunication device 10 predicts the SINR of each of the first telecommunication $20_k$ in the l-th frequency subband as:

$$\gamma_l^{(pre)} = P_{BS,l} \frac{|x_{BS,l}(p)|^2}{\eta}$$

If the uplink pilot signal in the l-th frequency subband is composed of $p_1$ symbols, with $p_1 > 1$, the SINR prediction is given by:

$$\gamma_l^{(pre)} = \frac{P_{BS,l}}{\eta P_{ref}} \left| \frac{1}{p_1} \sum_{p=1}^{p_1} x_{BS,l}(p) r_l(p)^* \right|^2.$$

In ideal condition with $z_{A,l}(p)=0$, we have $$\gamma_l^{(pre)} = P_{BS,l} \frac{|h_l|^2}{I_l}$$

which corresponds theoretically to the SINR of the first telecommunication device $20_k$.

At next step S502, the processor 300 determines the modulation and coding scheme to be used for the transfer of signals representative of groups of date to each first telecommunication device $20_k$ in the respective subbands using the determined SINR in each subbands.

In a variant of realisation, the processor 300, using the determined SINR in each subbands, determines the transmission power $P_{BS,l}$ in each subband in order to adjust the SINR $\gamma_l^{(pre)}$ to a predetermined value.

In another variant of realisation, the processor 300 determines using the determined SINR for all the first telecommunication devices $20_1$ to $20_K$, the first telecommunication device 20 to which signals representative of a group of data have to be sent.

Figure 6:
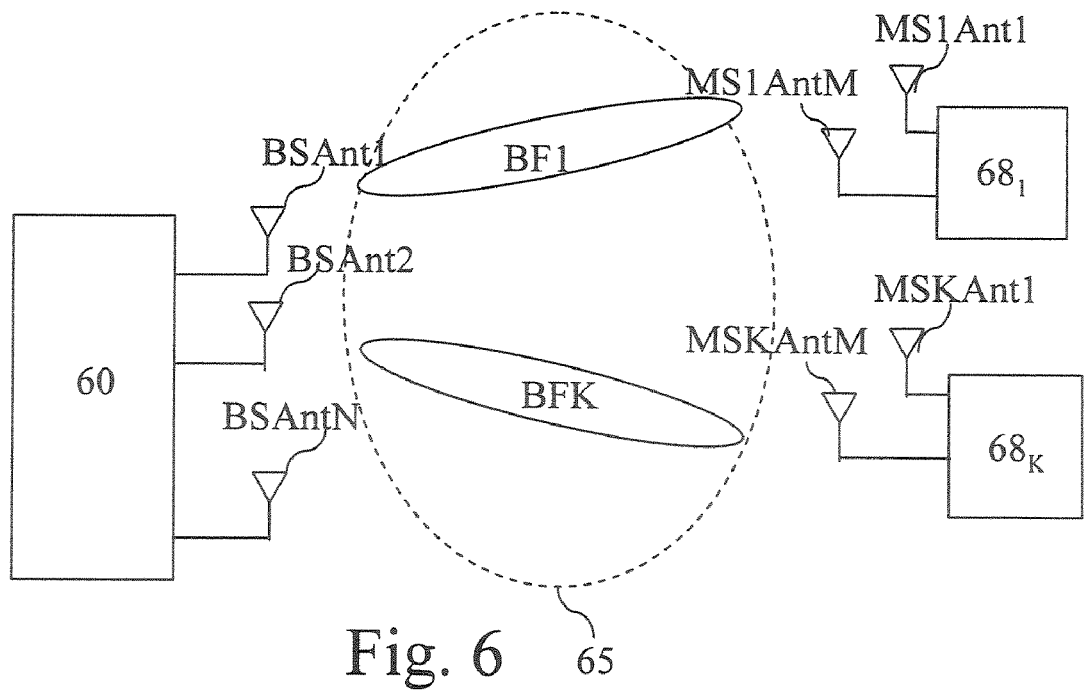
FIG. 6 is a diagram representing the architecture of a second telecommunication system in which the present invention is implemented.

FIG. 6 is a diagram representing the architecture of a second telecommunication system in which the present invention is implemented.

In the second telecommunication system of the FIG. 6, at least one first telecommunication device $68_k$, with k=1 to K, is linked through a wireless network 65 to a second telecommunication device 60 using an uplink and a downlink channel.

Preferably, and in a non limitative way, the second telecommunication device 60 is a base station or a node of the wireless network 65. The first telecommunication devices $68_1$ to $68_K$ are terminals like mobile phones or personal computers.

The second telecommunication system is a wireless telecommunication system which uses OFDMA in combination with TDD and MIMO schemes. The signals transferred in uplink and downlink channels are duplexed in different time periods of same frequency bands. In an OFDMA scheme, the overall system bandwidth is partitioned into L plural orthogonal frequency subbands, which are also referred to as frequency bins or subchannels. With OFDMA, each frequency subband is associated with subcarriers upon which data may be modulated. The channel responses between the uplink and downlink channels of the telecommunication network 65 are reciprocal.

Reciprocal means that if the downlink channel conditions are represented by a downlink matrix the uplink channel conditions can be expressed by an uplink matrix which is the transpose of the downlink matrix.

The second telecommunication device 60 transfers signals representatives of a group of data to the first telecommunication devices $68_1$ to $68_K$ through the downlink channel and the first telecommunication devices $68_1$ to $68_K$ transfer signals to the second telecommunication device 60 through the uplink channel.

The signals transferred by the first telecommunication devices $68_1$ to $68_K$ are signals representatives of a group of data and/or pilot signals which are weighted by at least a weight determined from the interference components measured by the first telecommunication devices $68_1$ to $68_K$.

A group of data is as example a frame constituted at least by a header field and a payload field which comprises classical data like data related to a phone call, or a video transfer and so on.

Pilot signals are predetermined sequences of symbols known by the telecommunication devices. Pilot signals are as example and in a non limitative way Walsh Hadamard sequences.

The second telecommunication device 60 has at least one antenna and more preferably N antennas noted BSAnt1 to BSAntN. The second telecommunication device 60 preferably controls the spatial direction of the signals transferred to each of the first telecommunication devices 68 according to at least signals transferred by the first telecommunication devices $68_j$ to $68_K$ as it will be disclosed hereinafter.

More precisely, when the second telecommunication device 60 transmits signals representatives of a group of data to a given first telecommunication device $68_k$ through the downlink channel, the signals are at most L*N times duplicated and each duplicated signal is weighted, i.e. multiplied, by an element of a downlink weighting vector $w_{n,l}$, with n=1 to at most N, of the second telecommunication device 60. As a result, the second telecommunication device 60 performs beamforming, i.e. controls the spatial direction of the transmitted signals.

The ellipse noted BF1 in the FIG. 6 shows the pattern of the radiated signals by the antennas BSAnt1 to BSAntN which are transferred to the first telecommunication device $68_1$ by the second telecommunication device 60.

The ellipse noted BFK in the FIG. 6 shows the pattern of the radiated signals by the antennas BSAnt1 to BSAntN which are transferred to the first telecommunication device $68_K$ by the second telecommunication device 60.

The first telecommunication devices $68_1$ to $68_K$ have M antennas noted respectively MS1Ant1 to MS1AntM and MSKAnt1 to MSKAntM. It has to be noted here that the number M of antennas may vary according to each first telecommunication device $68_k$ with k=1 to K. Each first telecommunication device $68_1$ to $68_k$ controls the spatial direction of the signals transferred to the second telecommunication device 60 as it will be disclosed hereinafter.

Each first telecommunication device $68_k$ transfers, through the antennas MSkAnt1 to MSkAntM, signals to be transmitted to the second telecommunication device 60. More precisely, when the first telecommunication device $68_k$ transmits signals to the second telecommunication device 60 through the uplink channel, the signals are at most L*M times duplicated and each duplicated signal is weighted, i.e. multiplied, by an elements of uplink weighting vectors $g_{m,l}$ with l=1 to L, with m=1 to at most M of the first telecommunication device $68_k$. As a result, each first telecommunication device $68_k$ performs beamforming, i.e. controls the spatial direction of the transmitted signals.

The ellipse noted BF1 in the FIG. 6 shows the pattern of the radiated signals by the antennas MS1Ant1 to MS1AntM which are transferred by the first telecommunication device $68_1$ to the second telecommunication device 60.

The ellipse noted BFK in the FIG. 6 shows the pattern of the radiated signals by the antennas MSKAnt1 to MSKAntM which are transferred by the first telecommunication device $68_K$ to the second telecommunication device 60.

Figure 7:
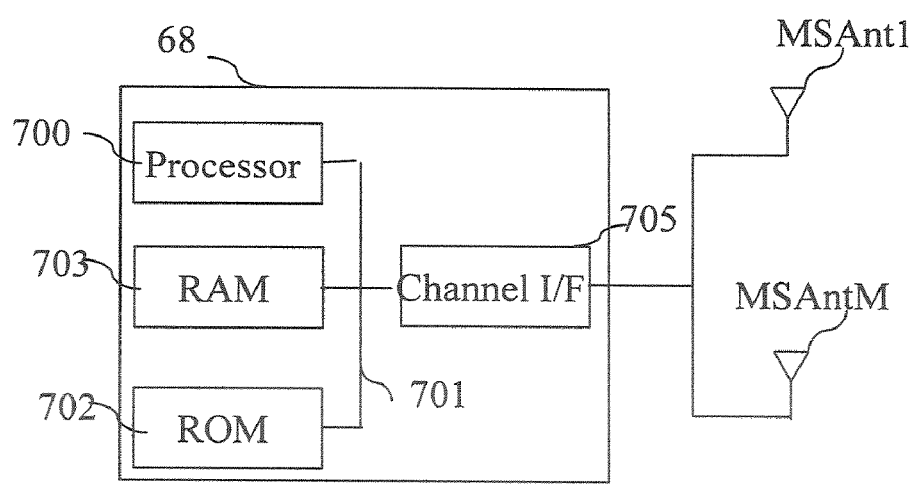
FIG. 7 is a diagram representing the architecture of the first telecommunication device according to the second mode of realisation of the present invention which is used in the second telecommunication system.

FIG. 7 is a diagram representing the architecture of the first telecommunication device according to the second mode of realisation of the present invention which is used in the second telecommunication system.

Figure 11:
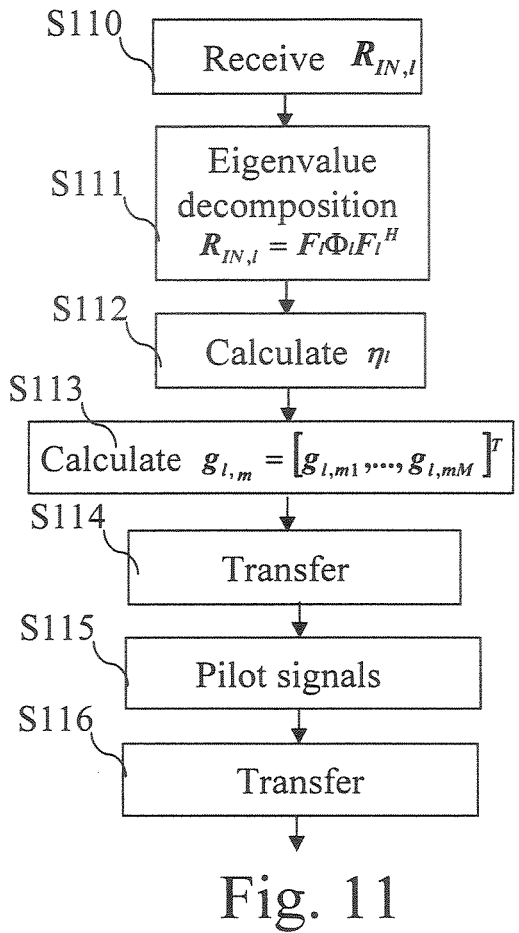
FIG. 11 is an algorithm executed by the first telecommunication device according to the second mode of realisation of the present invention.

The first telecommunication device 68, as example the first telecommunication device $68_k$ with k comprised between 1 to K has, for example, an architecture based on components connected together by a bus 701 and a processor 700 controlled by programs related to the algorithm as disclosed in the FIG. 11.

It has to be noted here that the first telecommunication device 68 is, in a variant, implemented under the form of one or several dedicated integrated circuits which execute the same operations as the one executed by the processor 700 as disclosed hereinafter.

The bus 701 links the processor 700 to a read only memory ROM 702, a random access memory RAM 703 and a channel interface 705.

The read only memory ROM 702 contains instructions of the programs related to the algorithm as disclosed in the FIG. 11 which are transferred, when the first telecommunication device $68_k$ is powered on to the random access memory RAM 703.

The RAM memory 703 contains registers intended to receive variables, and the instructions of the programs related to the algorithm as disclosed in the FIG. 11.

The channel interface 705 comprises means for measuring the interference components measured by the first telecommunication device $68_k$, means for weighting the pilot signals to be transferred to the second telecommunication device 60 by at least a power coefficient $\sqrt{\eta_l}$ with l=1 to L, means for weighting the weighted pilot signals to be transferred to the second telecommunication device 60 by weighting vectors $g_{m,l}$, with m=1 to M, and means for transferring at least a power information $\eta_l$ to the second telecommunication device 60. The channel interface 705 will be described in more detail in reference to the FIG. 8.

According to the present invention, the processor 700 determines, from the interference components measured by the first telecommunication device $68_k$, at most M*L uplink weighting vectors $g_{m,l}$ to be used for weighting respectively at most M pilot signals to be transferred to the second telecommunication device 60 and determines a single power coefficient $\eta$ or a power coefficient $\eta_l$ for each of the l=1 to at most L subbands to be used for weighting the at most M pilot signals to be transferred to the second telecommunication device 60.

Figure 8:
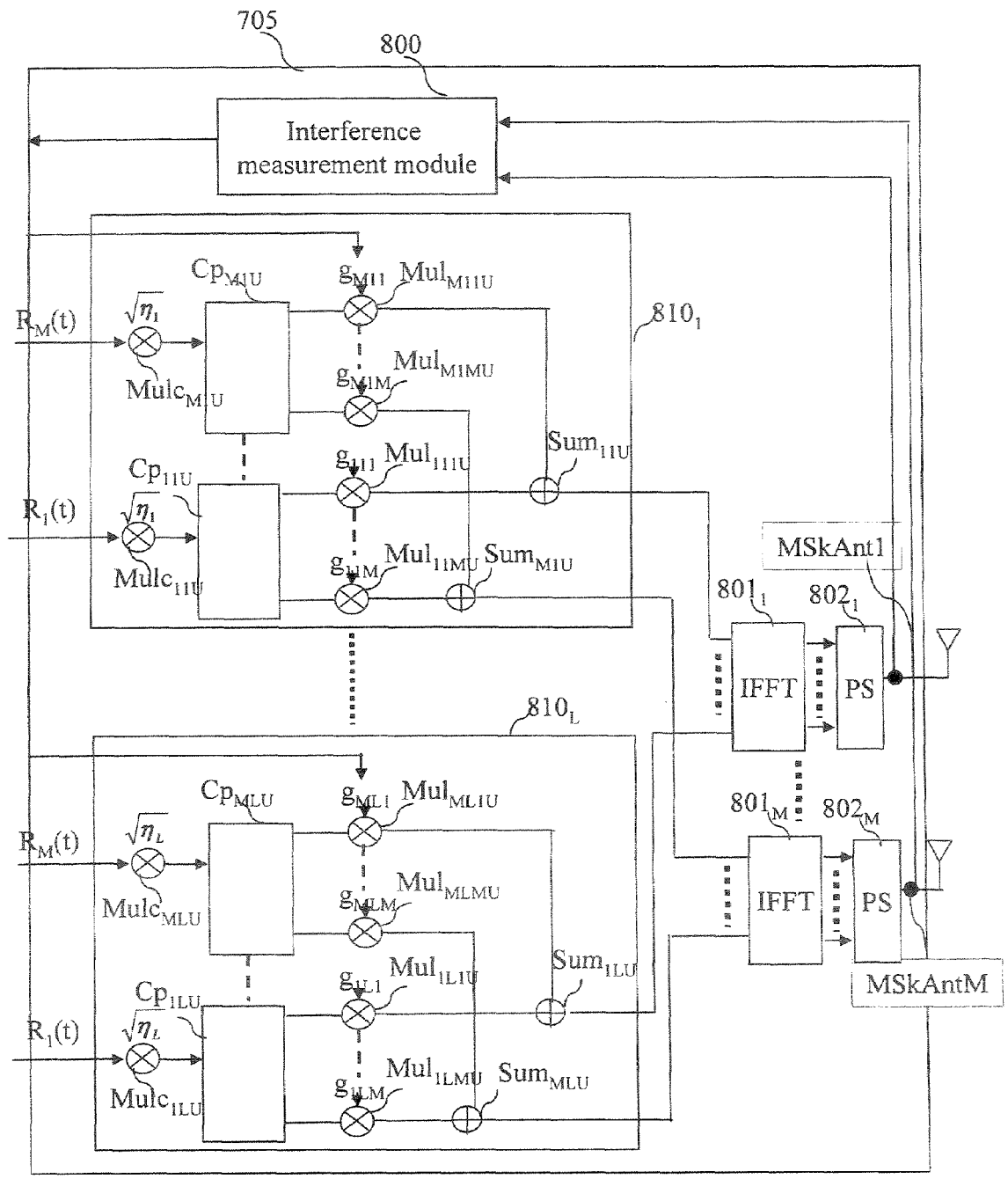
FIG. 8 is a diagram representing the architecture of a channel interface of the first telecommunication device according to the second mode of realisation of the present invention.

FIG. 8 is a diagram representing the architecture of a channel interface of the first telecommunication device according to the second mode of realisation of the present invention.

The channel interface 705 comprises an interference measurement module 800 which measures the interference components measured by the first telecommunication device $68_k$.

The interference measurement module 800 determines the interference correlation matrices $R_{IN,l}$, with l=1 to L of the first telecommunication device $20_k$ which are respectively representative of the interferences components measured in each of the l=1 to L frequency subbands of the MIMO-OFDMA system.

When the second telecommunication device 60 transfers, in each of the L frequency subbands, a signal $s_l(p)$ with a power $P_{BS,l}$ and $(E\lfloor |s_l(p)|^2 \rfloor=1$, the p-th signal $x_l(p)$ received by the first telecommunication device $68_k$ in the l-th frequency subband is equal to $x_l(p)=H_l\sqrt{P_{BS,l}}s_l(p)+z_l(p)$ where $z_l(p)=[z_{l,1}(p), \ldots, z_{l,M}(p)]^T$ is the interference plus noise vector of the first telecommunication 68k in the l-th frequency subband, $H_l$ is the MIMO channel matrix in the l-th frequency subband.

The interference measurement module 800 determines the interference correlation matrices $R_{IN,l}$ by averaging $z_l(p)z_l^H(p)$ over a large number of samples. Then, $E\lfloor z_l(p)z_l^H(p) \rfloor= R_{IN,l}$.

The channel interface 705 comprises L pilot signals processing devices noted $801_1$ to $810_L$, M Inverse Fast Fourier Transform module (IFFT) noted $801_1$ to $801_M$ which make an inverse fast Fourier transform and M parallel to serial converters noted $802_1$ to $802_M$ which converted the M inversed Fourier transformed signals into signals transferred to the respective antennas MSkAnt1 to MSkAntM.

The channel interface 705 further comprises means for transferring at least a power information $\eta_l$ to the second telecommunication device 60.

Each pilot signals processing device $801_1$, with l=1 to L comprises M means for weighting M pilot signals noted $R_1(t)$ to $R_M(t)$ to be transferred to the second telecommunication device 60 by a weighting coefficient $\sqrt{\eta_l}$. These means are noted $Mulc_{1IU}$ to $Mulc_{MIU}$ in the FIG. 8. Each pilot signals processing device 801, comprises M duplication modules noted $Cp_{1IU}$ to $CP_{MIU}$ which duplicate the weighted pilot symbols and means for weighting the duplicated pilot signals to be transferred to the second telecommunication device 60 by weighting vectors $g_{m,l}$. The means for weighting the weighted pilot signals to be transferred to the second telecommunication device 60 are composed of, M*M uplink multiplication modules noted $Mul_{111U}$ to $Mul_{M1MU}$, M uplink summation modules noted $Sum_{1IU}$ to $Sum_{MIU}$.

Each duplicated pilot signal is weighted by the elements of a uplink weighting vector $g_{m,l}$, with m=1 to M, determined by the processor 700.

The signals weighted by the first element of each uplink weighting vector $g_{m,l}$ are then summed by the adder $Sum_{1IU}$ and transferred to the IFFT module $801_1$. The signals weighted by the second element of each uplink weighting vector $g_{m,l}$ are then summed and transferred to the IFFT module $801_2$ and so on until the M-th element of the weighting vectors $g_{m,l}$.

It has to be noted here that the signals are, prior to be transferred to each antenna MSkAnt1 to MSkAntM, frequency up converted, mapped and so on, as it is done in classical wireless telecommunication devices.

It has to be noted here that, less than M pilot signals, as example M' pilot signals with M'≦M, can be transferred to the second telecommunication 10 as it will be disclosed hereinafter. In such case, M-M' pilot signals are set to null value and/or their corresponding weighting vectors $g_{m,l}$ are also set to null value.

It has to be noted here that the pilot signals transferred in each frequency subband a identical, but we can understand that the pilot symbols used in a frequency subband can be different from the used in another or the other frequency subbands.

Figure 9:
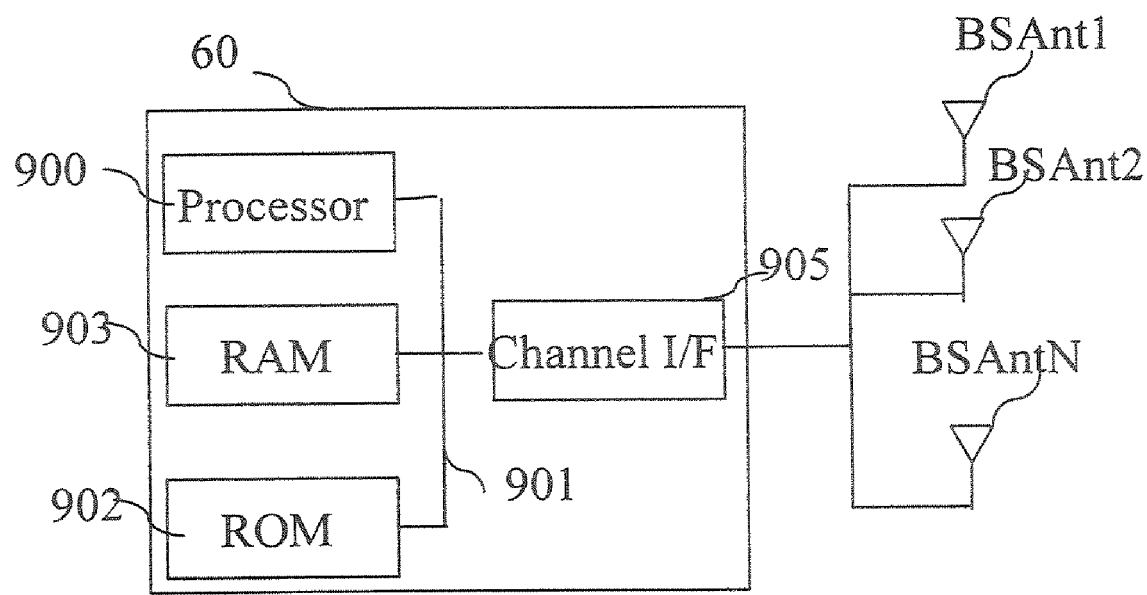
FIG. 9 is a diagram representing the architecture of the second telecommunication device according to the second mode of realisation of the present invention which is used in the second telecommunication system.

FIG. 9 is a diagram representing the architecture of the second telecommunication device according to the second mode of realisation of the present invention which is used in the second telecommunication system.

Figure 12:
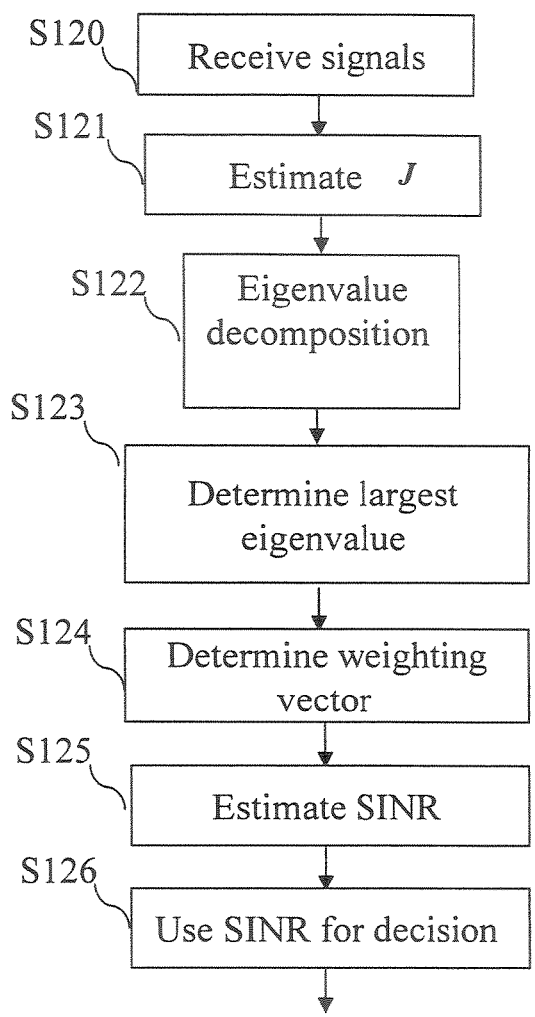
FIG. 12 is an algorithm executed by the second telecommunication device according to the second mode of realisation of the present invention.

The second telecommunication device 60 has, for example, an architecture based on components connected together by a bus 901 and a processor 900 controlled by programs related to the algorithm as disclosed in the FIG. 12.

It has to be noted here that the second telecommunication device 60 is, in a variant, implemented under the form of one or several dedicated integrated circuits which execute the same operations as the one executed by the processor 900 as disclosed hereinafter.

The bus 901 links the processor 900 to a read only memory ROM 902, a random access memory RAM 903 and a channel interface 905.

The read only memory ROM 902 contains instructions of the programs related to the algorithm as disclosed in the FIG. 12 which are transferred, when the second telecommunication device 60 is powered on to the random access memory RAM 903.

The RAM memory 903 contains registers intended to receive variables, and the instructions of the programs related to the algorithm as disclosed in the FIG. 12.

According to the second mode of realisation of the present invention, the processor 900 is able to determine from at least signals transferred by the first telecommunication device $68_k$ which are representative of pilot signals weighted weighting coefficients $\sqrt{\eta_l}$ and $g_{l,m}$ in each of the l=1 to L frequency subbands of the OFDMA system, the modulation and coding scheme for transferring signals representative of group of data to that first telecommunication device $68_k$ and/or to determine the first telecommunication device $68_k$ to which signals representative of a group of data have to be sent according to signals transferred by the first telecommunication devices 60.

The processor 900 is also able to determine, from at least signals transferred by each first telecommunication device $68_1$ to $68_K$ which are representative of pilot signals weighted by the power coefficients $\sqrt{\eta_l}$ and uplink weighting vectors representative of the interference components received by the first telecommunication device $68_k$ which has transferred the signals, the downlink weighting vectors $w_{n,l}$ to be used by the second telecommunication device 60 when it transfers signals to the first telecommunication device $68_k$ which has transferred the signals.

According to the second mode of realisation of the present invention, the channel interface 905 comprises means for receiving a power information η or plural power information $\eta_l$ from each the second telecommunication device 68.

The channel interface 905 comprises means for receiving weighted pilot signals from each first telecommunication device $68_1$ to $68_K$ means for receiving, from each first telecommunication device $68_1$ to $68_K$, a power information 17, for each frequency subband or a single power information η for all of the frequency subbands. The channel interface 905 comprises means for directing, using the downlink weighting vectors $w_{n,l}$, the signals representatives of groups of data transferred by the second telecommunication device 60 to a first telecommunication device $68_1$ to $68_K$. The channel interface 905 will be disclosed in more details in reference to the FIG. 10.

Figure 10:
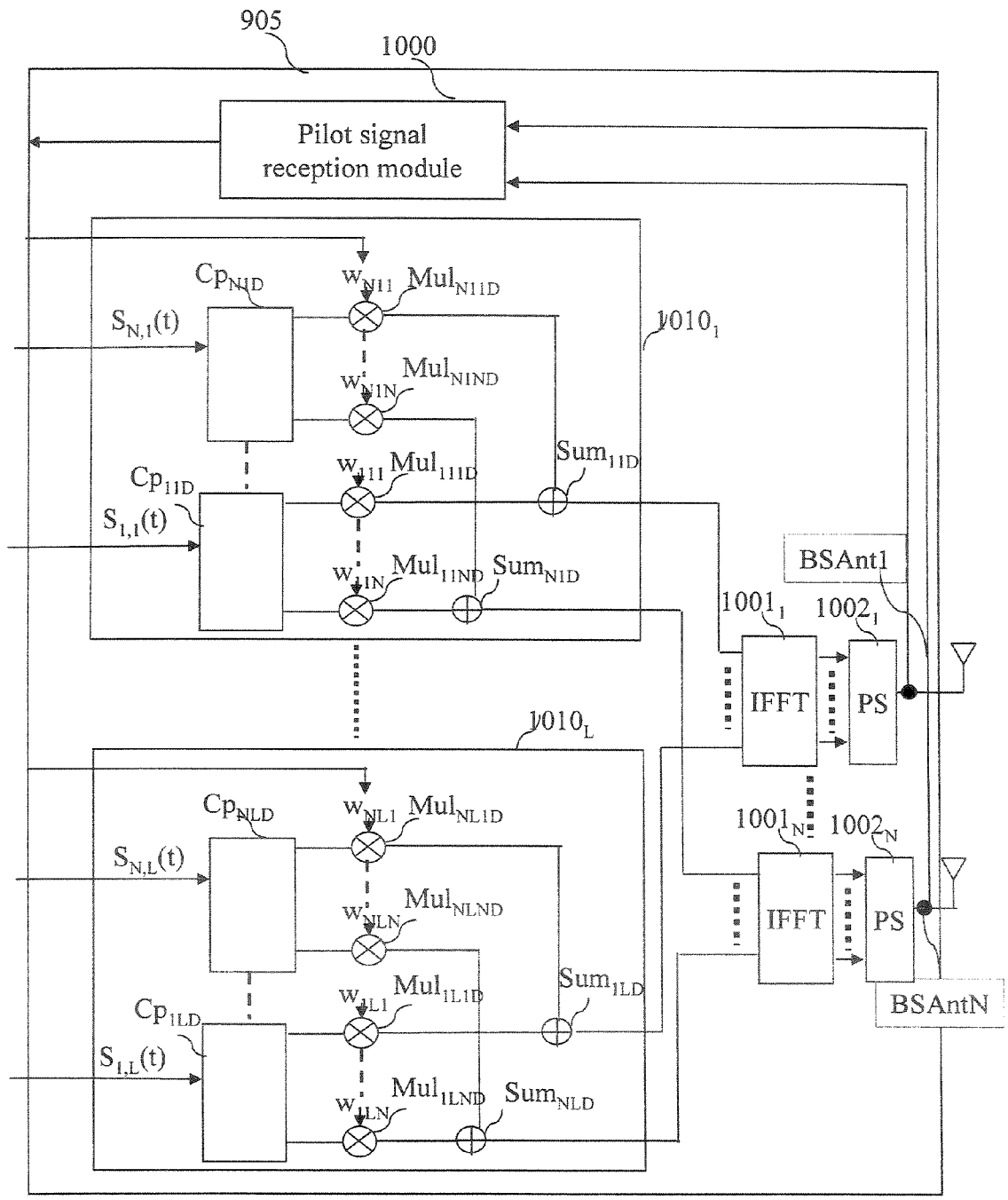
FIG. 10 is a diagram representing the architecture of a channel interface of the second telecommunication device according to the second mode of realisation of the present invention.

FIG. 10 is a diagram representing the architecture of a channel interface of the second telecommunication device according to the second mode of realisation of the present invention.

The channel interface 905 of the second telecommunication device 10 comprises a pilot signal reception module 1000.

The pilot signal reception module 1000 comprises means for receiving pilot signals weighted according the present invention by the first telecommunication devices $68_1$ to $68_K$ and a power information $\eta_l$ for each frequency subband or a single power information η for all of the frequency subbands from each of the first telecommunication devices $68_1$ to $68_K$.

The channel interface 905 comprises L signals processing devices noted $1010_1$ to $1010_L$ N IFFT modules noted $1001_1$ to $1001_N$ and N parallel to serial converters noted $1002_1$ to $1002_N$ which converted the N inversed Fourier transformed signals into signals transferred to the respective antennas BSAnt1 to BSAntN.

Each signals processing device $1010_l$, with l=1 to L, comprises N duplication modules noted $Cp_{1ID}$ to $CP_{NID}$ which duplicate the signals representative of a group of data and means for weighting the duplicated signals to be transferred to the first telecommunication devices 68 by weighting vectors $w_{n,l}$. The means for weighting the weighted signals to be transferred to the first telecommunication devices 68 are composed of, N*N downlink multiplication modules noted $Mul_{111D}$ to $Mul_{N1ND}$, N downlink summation modules noted $Sum_{1ID}$ to $Sum_{NID}$.

Each duplicated signal is weighted by the elements of a downlink weighting vector $w_{n,l}$, with n=1 to N, determined by the processor 900.

The signals weighted by the first element of each uplink weighting vector $w_{n,l}$ are then summed by the adder $Sum_{1ID}$ and transferred to the IFFT module $1001_1$. The signals weighted by the second element of each uplink weighting vector $w_{n,l}$ are then summed and transferred to the IFFT module $1001_2$ and so on until the N-th element of the weighting vectors $w_{n,l}$.

It has to be noted here that the signals are, prior to be transferred to each antenna BSAnt1 to BSAntN, frequency up converted, mapped and so on, as it is done in classical wireless telecommunication devices.

It has to be noted here that, less than N groups of data, as example N' with N'≦N, can be transferred to the first telecommunication devices 68 as it will be disclosed hereinafter.

In such case, the signals representative of N-N' groups of data are set to null value and/or their corresponding weighting vectors $w_{n,l}$ are also set to null value.

FIG. 11 is an algorithm executed by the first telecommunication device according to the second mode of realisation of the present invention.

The present algorithm is more precisely executed by each of the first telecommunication devices $68_1$ to $68_K$. At step S110, the processor 700 receives the interference correlation matrices $R_{IN,l}$, with l=1 to L, of the first telecommunication device $68_k$ which are respectively representative of the interferences generated by any other electric devices in each of the l=1 to L frequency subbands of the MIMO-OFDM system.

At next step S111, the processor 700 executes an eigenvalue decomposition of each of the interference correlation matrices $R_{IN,l}$. $R_{IN,l}=F_l\Phi_l F_l^H$, where $\Phi_l$ and $F_l$ are M*M diagonal and unitary matrices.

At next step S112, the processor 700 determines the power information $\eta_l$ for the l-th frequency subband with l=1 to L. The power information $\eta_l$ can be set to any value or to a predetermined value known by all the telecommunication devices 60 or 68.

The processor 700 determines the same power information η for all of the frequency subbands or determines a power information $\eta_l$ for each subband.

When the same power information η is determined for all of the frequency subbands, η is preferably equal to $$\eta = P_S\left(\frac{1}{ML}\sum_{l=1}^{L} tr\{R_{IN,l}^{-1}\}\right)^{-1}$$

where tr{x} is the trace of the matrix x i.e. the sum of diagonal elements of the matrix x and $P_s$ is the average transmit power per frequency subband per antenna.

When a power information $\eta_l$ is determined for each frequency subband, $$\eta_l = P_S\left(\frac{1}{M} tr\{R_{IN,l}^{-1}\}\right)^{-1}$$

At next step S113, the processor 700 calculates the uplink weighting vectors $g_{l,m}=[g_{l,m1}, \ldots, g_{l,mM}]^T$, with m=1 to M and l=1 to L using the following formula:

$$G_l=[g_{l,m1}, \ldots, g_{l,mM}]=F_l^*\Phi_l^{-1/2}.$$

In a variant of realisation, if some coefficients of the matrix $\Phi_l$ are lower than a predetermined threshold, the processor 700 doesn't transfer the corresponding uplink weighting vector to the channel interface. In such case, a reduced number of pilot signals needs then to be transferred to the second telecommunication device 60.

At next step S114 the processor 700 transfers the power information $\eta_l$ or η and the uplink weighting vectors $g_{l,m}=[g_{l,m1}, \ldots, g_{l,mM}]^T$, with m=1 to M and l=1 to L to the channel interface 705.

At next step S115, the processor 700 transfers at most M pilot signals to the channel interface 705. The pilot signal $r_{l,m}(p)$, with m=1 to M, transferred has $p_0$ symbols which are mutually orthogonal as:

$$\frac{1}{p_0}\sum_{p=1}^{p_0} r_{l,m1}(p)^* r_{l,m2}(p) = 1$$

if $m_1 = m_2$ and 0 otherwise.

At next step S116, each of the at most M pilot signals are duplicating at most M times. Each duplicated pilot signal is weighted by the elements of an uplink weighting vector $g_{l,m} = [g_{l,m1}, \ldots, g_{l,mM}]^T$ and transferred to the second telecommunication device 60.

FIG. 12 is an algorithm executed by the second telecommunication device according to the second mode of realisation of the present invention.

At step S120, the signals transferred at step S116 by at least a first telecommunication device $68_k$, are received through the channel interface 905 of the second telecommunication device 60.

In the l-th frequency subband, the p-th sample $x_{BS,l}(p)$ of the receive signal by the second telecommunication device 60 is expressed as:

$x_{BS,l}(p) = \sqrt{\eta_l} H_l^T G_l r_l(p) + z_{BS,l}(p)$, wherein $r_l(p) = [r_{l,1}(p), \ldots, r_{l,M}(p)]^T$ denotes the pilot signal received from all the M antennas of the first telecommunication devices $68_k$ which sent the signals, $z_{BS,l}(p) = [z_{BS,l,1}(p), \ldots, z_{BS,l,N}(p)]^T$ represents the N*1 second telecommunication device 60 interference components and in the case of a reciprocal channel, the uplink channel is expressed as $H_l^T$ using the downlink channel matrix $H_l$ for the l-th subband.

At next step S121, the processor 900 estimates, for each of the L frequency subbands, the product of matrices $H_l^H G_l$.

The received signals $p=1, \ldots, p_0$ are totally expressed in matrix form as:

$X_{BS,l} = [x_{BS,l}(1), \ldots, x_{BS,l}(p_0)] = \sqrt{\eta_l} H_l^H G_l R_l + Z_{BS,l}$ $R_l = [r_l(1), \ldots, r_l(p_0)]$ $Z_{BS,l} = [z_{BS,l}(1), \ldots, z_{BS,l}(p_0)]$ where $$\frac{R_l R_l^H}{p_0} = I \text{ as } \frac{1}{p_0}\sum_{p=1}^{p_0} r_{l,m1}(p)^* r_{l,m2}(p) = 1 \text{ if } m_1 = m_2$$

and 0 otherwise.

Then, the processor 900 estimates $H_l^T G_l$ as $$J_l = \frac{1}{\sqrt{\eta_l} \, p_0} X_{BS,l} R_l^H = H_l^T G_l + \frac{1}{\sqrt{\eta_l} \, p_0} Z_{BS,l} R_l^H.$$

At next step S122, the processor 900 executes, for each of the L frequency subbands, an eigenvalue decomposition of $J_l^* J_l^T$.

At next step S123, the processor 900 determines, for each of the L frequency subbands, the largest eigenvalue noted $\rho<J_l^* J_l^T>$ of each of the matrices $J_l^* J_l^T$.

It has to be noted here that, if at least two groups of data have to be transferred in parallel to the first telecommunication device $68_k$, the processor 900 determines the at least two largest eigenvalues of the matrix $J_l^* J_l^T$.

At next step S124, the processor 900 determines the downlink weighting vectors $w_{n,l}$ with l=1 to L to be used in the respective l=1 to L frequency subbands for transferring signals representing a group of data to the first telecommunication device $68_k$ which has transferred the signals received at step S120.

The downlink weighting vector $w_{n,l}$ for the l-th frequency subband is the eigenvector noted $e<J_l^* J_l^T>$ which corresponds to largest the eigenvalue.

If at least two groups of data have to be transferred in parallel to the first telecommunication device $68_k$, the processor 900 determines at least two downlink weighting vectors for each subband. The processor 900 determines the downlink weighting vector $w_{n,l}$ for the l-th frequency subband, with n being equal or upper than 2, are the eigenvector noted which corresponds to largest the at least two eigenvalues.

At next step S125, the processor 900 estimates, for each of the L frequency subbands, the SINR of the first telecommunication device $68_k$ which has transferred the signals received at step S120.

Using the transmit power $P_S^{(n,l)}$ for the n-th group of data, the SINR $\gamma_{n,l}^{(pre)}$ is predicted using the following formula:

$\gamma_{n,l}^{(pre)} = P_S^{(n,l)} \cdot \rho_n \langle J_l^* J_l^T \rangle$ where $\rho_n \langle \, \rangle$ is the n-th largest eigenvalue of $\langle \, \rangle$.

It has to be noted here that the second telecommunication device 60 can direct the signals transferred to the first telecommunication device $68_k$ which has transferred the signals received at step S120 considering the effect of interferences on the first telecommunication device $68_k$ without having the complete knowledge of $H_l$ and $R_{IN,l}$.

At next step S126, the processor 900 determines the modulation and coding scheme to be used for the transfer of signals representative of a group of data to the first telecommunication device $68_k$ using the determined SINR or the processor 300 determines, using the predicted SINR of all the first telecommunication devices $68_1$ to $68_K$, the first telecommunication device $68_k$ to which signals representative of a group of data have to be sent.

In a variant of realisation, the processor 900 adjusts the transmission power $P_S^{(n,l)}$ by setting the predicted SINR to a predetermined SINR.

Naturally, many modifications can be made to the embodiments of the invention described above without departing from the scope of the present invention.

The invention claimed is:

1. Method for reporting, through a wireless network using multiple frequency subbands, interference components received by a first telecommunication in a first and a second frequency subbands of the wireless network, to a second telecommunication device, characterised in that the method comprises the steps executed by the first telecommunication device of:

measuring the interference components received by the first telecommunication device in the first frequency subband and in the second frequency subband of the wireless network, determining at least a first weight from the measured interference components in the first frequency subband and at least a second weight from the measured interference components in the second frequency subband, weighting a first pilot signal with the at least one first determined weight and weighting a second pilot signal with the at least one second determined weight, transferring the first weighted pilot signal through said first frequency subband and the second weighted pilot signal through said second frequency subband to the second telecommunication device.

2. Method according to claim 1, characterised in that the first telecommunication device and the second telecommunication device comprise one antenna, and in that, the first and second determined weights are respectively inversely proportional to the interference components measured in the first and second frequency subbands.

3. Method according to claim 2, characterised in that the method further comprises the steps of:
determining a power information for the first and second frequency subbands,
transferring to the second telecommunication device signals representing the power information.

4. Method according to claim 2, characterised in that a power information is determined for each of the first and second frequency subbands and for other frequency subbands according to the following formula:

$$\eta = P_S \left( \frac{1}{L} \sum_{l=1}^{L} \frac{1}{I_l} \right)^{-1},$$

where $P_S$ is the average transmit power per frequency subband, L is the number of the first, second frequency and other frequency subbands, l is an indicia of the first second and other frequency subbands and $I_l$ is interference components measured in the l-th frequency subband.

5. Method according to any of the claims 1 to 4, characterised in that each frequency subband include plural subcarrier frequencies and in that the measured the interference components received by the first telecommunication device in the first frequency subband are the average of the interference components measured in each of the subcarrier frequencies of the first frequency subband and the measured the interference components received by the first telecommunication device in the second frequency subband are the average of the interference components measured in each of the subcarrier frequencies of the second frequency subband.

6. Method according to any of the claims 1 to 4, characterised in that each frequency subband include plural subcarrier frequencies and the measured the interference components received by the first telecommunication device in the first frequency subband are the interference components measured in at least a subcarrier frequency of the first frequency subband and the measured the interference components received by the first telecommunication device in the second frequency subband the interference components measured in at least a subcarrier frequency of the first frequency subband.

7. Method according to claim 1, characterised in that the first telecommunication device comprises M antennas, the second telecommunication device comprises N antennas and in that the measured interferences components are set, for at least the first and second frequency subbands, under the form of an interference correlation matrix $R_{IN,l}$, where l denotes the indicia of the first and second frequency subbands, and the determination, for each first and second frequency subbands, of the at least one first and second weights from the measured interference components is decomposed into sub-steps of:
executing an eigenvalue decomposition of the interference correlation matrix $R_{IN,l} = F_l \Phi_l F_l^H$ in order to obtain a first matrix $F_l$ and a second matrix $\Phi_l$, where $F_l^H$ denotes the complex conjugate transpose of the matrix $F_l$,
determining, for the first and second frequency subbands respectively at most M weighting vectors $g_{l,m}$ from at least the first and the second matrices, where m=1 to at most M,
weighting each of the at most M pilot signals by a respective weighting vector.

8. Method according to claim 7, characterised in that the at most M weighting vectors $g_{l,1}$ to $g_{l,M}$ are determined according to the following formula:

$$[g_{l,1}, \ldots, g_{l,M}] = F_l^* \Phi_l^{-1/2} \text{ where } x^* \text{ denotes the conjugate of } x.$$

9. Method according to claim 7, characterised in that the method further comprises the steps of:
determining at least a power coefficient,
weighting the at most M pilot signals by the power coefficient,
transferring to the second telecommunication device signals representing at least a power information which is related to the determined power coefficient.

10. Method according to claim 9, characterised in that a power coefficient $\sqrt{\eta}$ is determined for the first and second frequency subbands according to the following formula:

$$\eta = P_S \left( \frac{1}{M} tr\{R_{IN,l}^{-1}\} \right)^{-1}$$

where $tr\{x\}$ is the trace of the matrix x and $P_s$ is the average transmit power per frequency subband and per antenna and the power information is equal to $\eta$.

11. Method according to claim 9, characterised in that a power coefficient $\eta_l$ is determined for each the first, second and for other frequency subbands according to the following formula:

$$\eta_l = P_S \left( \frac{1}{ML} \sum_{l=1}^{L} tr\{R_{IN,l}^{-1}\} \right)^{-1}$$

where $tr\{x\}$ is the trace of the matrix x and $P_s$ is the average transmit power per frequency subband and per antenna and the power information is equal to $\eta_l$.

12. A memory device to store a computer program which comprises instructions or portions of code for implementing the steps of the method according to claim 1 when said computer program stored in the memory is executed.

13. Method for controlling the transfer of signals to a first telecommunication device by a second telecommunication device through a wireless network using multiple frequency subbands, characterised in the method comprises the steps executed by the second telecommunication device of:
receiving from the first telecommunication device, at least a first pilot signal through a first frequency subband and at least a second pilot signal through a second frequency subband,
determining, from the at least first pilot signal, information representative of interference components received by the first telecommunication device in the first frequency subband,
determining, from the at least second pilot signal, information representative of interference components received by the first telecommunication device in the second frequency subband,
controlling the transfer of signals representative of a group of data to the first telecommunication device according to the determined information representative of interference components received by the first telecommunication device.

14. Method according to claim 13, characterised in that the first telecommunication device and the second telecommunication device comprise one antenna, and in that the method comprises further step of receiving from the first telecommunication device, signals representing at least a power information and in that the information representative of interference components received by the first telecommunication device is determined from the at least first and second pilot signals and the at least one power information.

15. Method according to claim 14, characterised in that the control of the transfer of signals representative of a group of data to the first telecommunication device is the determination of the transmission power to be used for transferring at least a group of data to the first telecommunication device.

16. Method according to claim 14, characterised in that the control of the transfer of signals representative of a group of data to the first telecommunication device is the determination of the modulation and coding scheme to be used for transferring signals representative of the group of data to the first telecommunication device.

17. Method according to any of the claims 15 and 16, characterised in that plural first telecommunication devices transfer at least a first and second pilot signals and signals representative of at least a power information and in that the control of the transfer of signals representative of the group of data to the first telecommunication device is the determination to which first telecommunication device or devices among the plural first telecommunication devices, signals representing at least a group of data have to be transferred.

18. Method according to claim 13, characterised in that the second telecommunication device comprises N antennas and the determined information representative of interference components received by a first telecommunication device in each first and second frequency subbands are a first and a second weighting vectors and in that the control of the transfer of signals representative of a group of data to the first telecommunication device in the first and second frequency subbands is made by weighting the signals representative of the group of data respectively by the first and the second weighting vectors.

19. Method according to claim 18, characterised in that the first telecommunication device comprises M antennas at most M pilot signals are received in each first and second frequency subbands and in that each weighting vector is determined by:
calculating a matrix $J_l$ from the at most M received pilot signals, where l is an indicia of the first and second frequency subbands,
executing, for each first and second frequency subband, an eigenvalue decomposition of the product of two matrices obtained from the calculated matrix in order to obtain eigenvectors and eigenvalues,
selecting, for each first and second frequency subband, the eigenvector corresponding to the largest eigenvalue of the respective products of two matrices obtained from the calculated matrix.

20. Method according to claim 19, characterised in that the product of two matrices obtained from the calculated matrix is equal to $J_l^* J_l^T$, where $J_l^*$ denotes the conjugate of $J_l$ and $J_l^T$ denotes the transpose of $J_l$.

21. Method according to any of the claims 18 to 20, characterised in that the method comprises further step of receiving from the first telecommunication device, signals representing at least a power information and in that the information representative of interference components received by the first telecommunication device is determined from the M received pilot signals and the at least one power information.

22. Method according to claim 21, characterised in that the control of the transfer of signals representative of a group of data to the first telecommunication device is the determination of the modulation and coding scheme to be used for transferring signals representative of a group of data to the first telecommunication device.

23. Method according to claim 21, characterised in that plural first telecommunication devices transfer pilot signals and signals representative of a power information and in that the control of the transfer of signals representative of a group of data to the first telecommunication device is the determination to which first telecommunication device or devices among the plural first telecommunication devices signals representing at least a group of data have to be transferred.

24. A memory device to store a computer program which comprises instructions or portions of code for implementing the steps of the method according to claim 13 when said computer program stored in the memory is executed.

25. Device for reporting, through a wireless network using multiple frequency subbands, interference components received by a first telecommunication in a first and a second frequency subbands of the wireless network to a second telecommunication device, characterised in that the device for reporting interference components is included in first telecommunication device and comprises:
means for measuring the interference components received by the first telecommunication device in the first frequency subband and in the second frequency subband of the wireless network,
means for determining at least a first weight from the measured interference components in the first frequency subband and at least a second weight from the measured interference components in the second frequency subband,
means for weighting a first pilot signal with the at least one first determined weight and weighting a second pilot signal with the at least one second determined weight,
means for transferring the first weighted pilot signal through said first frequency subband and the second weighted pilot signal through said second frequency subband to the second telecommunication device.

26. Device for controlling the transfer of signals to a first telecommunication device by a second telecommunication device through a wireless network using multiple subbands, characterised in the device for controlling the transfer of signals is included in the second telecommunication device and comprises:
means for receiving, from the first telecommunication device, at least a first pilot signal through a first frequency subband and at least a second pilot signal through a second frequency subband,
means for determining, from the at least first pilot signal, information representative of interference components received by the first telecommunication device in the first frequency subband,
means for determining, from the at least second pilot signal, information representative of interference components received by the first telecommunication device in the second frequency subband,
means for controlling the transfer of signals representative of a group of data to the first telecommunication device according to the determined information representative of interference components received by the first telecommunication device.

* * * * *